United States Patent
Lepp et al.

(10) Patent No.: US 11,696,246 B2
(45) Date of Patent: *Jul. 4, 2023

(54) AGGREGATING MESSAGES INTO A SINGLE TRANSMISSION

(71) Applicant: BlackBerry Limited, Waterloo (CA)

(72) Inventors: James Randolph Winter Lepp, Ottawa (CA); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,149

(22) Filed: Dec. 14, 2021

(65) Prior Publication Data

US 2022/0110078 A1    Apr. 7, 2022

Related U.S. Application Data

(63) Continuation of application No. 16/677,813, filed on Nov. 8, 2019, now Pat. No. 11,202,273.

(51) Int. Cl.
*H04W 4/00*    (2018.01)
*H04W 56/00*   (2009.01)
*H04W 4/44*    (2018.01)

(52) U.S. Cl.
CPC ......... *H04W 56/0045* (2013.01); *H04W 4/44* (2018.02); *H04W 56/003* (2013.01)

(58) Field of Classification Search
CPC ....................................................... H04W 4/44
See application file for complete search history.

(56) References Cited

U.S. PATENT DOCUMENTS

| | | |
|---|---|---|
| 6,504,923 B1 | 1/2003 | Swale |
| 11,202,273 B2 | 12/2021 | Lepp et al. |
| 2007/0201369 A1* | 8/2007 | Pedersen ............... H04W 28/12 370/235 |
| 2007/0291793 A1 | 12/2007 | Jang et al. |
| 2010/0232404 A1* | 9/2010 | Chen ...................... H04W 4/44 370/470 |
| 2011/0116488 A1 | 5/2011 | Grandhi |
| 2012/0147899 A1 | 6/2012 | Du |

(Continued)

FOREIGN PATENT DOCUMENTS

| | | |
|---|---|---|
| WO | 2015044424 A1 | 4/2015 |
| WO | 2016144887 A1 | 9/2016 |
| WO | 2020009389 A1 | 1/2020 |

OTHER PUBLICATIONS

IEEE Access, Selinis et al., The Race to 5G Era; LTE and Wi-Fi, 2018 (39 pages).

(Continued)

*Primary Examiner* — Chi H Pham
*Assistant Examiner* — Elisabeth Benoit Magloire
(74) *Attorney, Agent, or Firm* — Trop, Pruner & Hu, P.C.

(57) ABSTRACT

In some examples, a source device categorizes a plurality of messages for transmission to a recipient device, the plurality of messages comprising vehicle-related information. Based on the categorizing, the source device identifies selected messages of the plurality of messages to be aggregated. The source device aggregates the selected messages into a single transmission from the source device to the recipient device.

20 Claims, 7 Drawing Sheets

(56) References Cited

U.S. PATENT DOCUMENTS

| | | |
|---|---|---|
| 2014/0314060 A1 | 10/2014 | Park et al. |
| 2015/0024677 A1 | 1/2015 | Gopal |
| 2015/0326668 A1 | 11/2015 | Mader et al. |
| 2015/0341853 A1 | 11/2015 | Cho |
| 2016/0205025 A1* | 7/2016 | Wakabayashi .... H04W 52/0222 370/235 |
| 2017/0126363 A1 | 5/2017 | Wang |
| 2017/0222913 A1 | 8/2017 | Chia et al. |
| 2017/0230149 A1 | 8/2017 | Wang |
| 2017/0311284 A1 | 10/2017 | Basu |
| 2018/0206264 A1 | 7/2018 | Li et al. |
| 2019/0007253 A1 | 1/2019 | Cavalcanti |
| 2019/0222680 A1 | 7/2019 | Chu |
| 2019/0268447 A1 | 8/2019 | Yang et al. |
| 2019/0268827 A1 | 8/2019 | Kim |
| 2019/0280919 A1 | 9/2019 | Sadeghi |
| 2019/0288763 A1 | 9/2019 | Oteri |
| 2019/0327664 A1 | 10/2019 | Zhang |
| 2019/0363843 A1 | 11/2019 | Gordaychik |
| 2020/0059290 A1 | 2/2020 | Pan |
| 2020/0159950 A1 | 5/2020 | Bodin |
| 2020/0162908 A1* | 5/2020 | Kim ................. H04W 40/24 |
| 2020/0228948 A1 | 7/2020 | Watfa |
| 2020/0229032 A1 | 7/2020 | McCann |
| 2021/0084542 A1 | 3/2021 | Ahmad |
| 2021/0360626 A1* | 11/2021 | Gong ................. H04W 4/40 |

OTHER PUBLICATIONS

Office Actions of File History of U.S. Appl. No. 16/676,835, dated Mar. 14, 2022, Oct. 13, 2021, and Jun. 4, 2021 (62 pages).

Banos-Gonzalez et al., IEEE 802.11ah: A Technology to Face the IoT Challenge, MDPI, Sensors 2016 (21 pages).

Alexandre Petrescu, Transmission of IPv6 Packets over IEEE 802.11 Networks Outside the Context of a Basic Service Set, Technical Report • Jun. 2014 (32 pages).

Lin et al., Frame Aggregation and Optimal Frame Size Adaptation for IEEE 802.11n WLANs, IEEE GLOBECOM 2006 (6 pages).

European Patent Office, Extended European Search Report for Appl. No. 20193497.3 dated Dec. 18, 2020 (13 pages).

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.

IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 4: Enhancements for Very High Throughput for Operation in Bands below 6 GHz, IEEE Std 802.11ac™—2013 (425 pages).

IEEE Standard for Information technology (IEEE Std 802.11p-2010)—Telecommunications and Information Exchange Between Systems Local and Metropolitan Area Networks—Specific Requirements Part 11: Wireless LAN Medium Access Control (MAC) and Physical Layer (PHY) Specifications, Amendment 6: Wireless Access in Vehicular Environments, Jul. 15, 2010 (51 pages).

IEEE Standard for Wireless Access in Vehicular Environments (WAVE)—Networking Services, IEEE Vehicular Technology Society, IEEE Std 1609.3™—2016 (160 pages).

IEEE P802.11ax™/D2.2, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, Feb. 2018 (620 pages).

3GPP TS 36.321 V14.11.0 Technical Specification 3rd Generation Partnership Project; Technical Specification Group Radio Access Network; Evolved Universal Terrestrial Radio Access (E-UTRA); Medium Access Control (MAC) protocol specification (Release 14) (Jun. 2019) (110 pages).

Draft ETSI EN 302 663 V1.3.0 Intelligent Transport Systems (ITS); ITS-G5 Access layer specification for Intelligent Transport Systems operating in the 5 GHz frequency (May 2019) (24 pages).

Ericsson, 3GPP QoS concepts, Power Point Presentation, 2010 (24 pages).

Wikipedia, Frame aggregation, Feb. 22, 2019 (2 pages).

(1 of 2) IEEE P802.11-REVmd™/D2.0, IEEE P802.11-REVmdTM/D2.0, Draft Standard for Information technology—Telecommunications and information exchange between systems, Local and metropolitan area networks—Specific requirements, Part 11: Wireless LAN Medium Access Control (MAC) and Physical Layer (PHY) Specifications, Dec. 2018 (pp. 1-2300).

(2 of 2) IEEE P802.11-REVmd™/D2.0, IEEE P802.11-REVmdTM/D2.0, Draft Standard for Information technology—Telecommunications and information exchange between systems, Local and metropolitan area networks—Specific requirements, Part 11: Wireless LAN Medium Access Control (MAC) and Physical Layer (PHY) Specifications, Dec. 2018 (pp. 2301-4601).

Association of Radio Industries and Businesses, ARIB Standard, Association of Radio Industries and Businesses, ARIB STD-T109 Version 1.3, English Translation, 700 MHz Band, Intelligent Transport Systems, Jul. 2017 (245 pages).

U.S. Department of Transportation, Dedicated Short-Range Communications Roadside Unit Specifications, FHWA-JPO-17-589, Apr. 28, 2017 (126 pages).

IEEE Vehicular Technology Society, IEEE Std 1609.4™—2016, IEEE Standard for Wireless Access in Vehicular Environments (WAVE)—Multi-Channel Operation, 2016 (94 pages).

Fischer et al., MAC Service Updates for NGV, IEEE 802.11-19/0276r4, May 2019 (19 pages).

SAE International, Surface Vehicle Standard, J2945™/1, On-Board System Requirements for V2V Safety Communications, Mar. 2016 (127 pages).

European Patent Office, Communication pursuant to Article 94(3) EPC for Appl. No. 20193497.3 dated Jan. 3, 2023 (14 pages).

\* cited by examiner

|  | Periodic | Random |
|---|---|---|
| Delay Tolerant | A | B |
| Delay Intolerant | C | D |

AGGREGATING MESSAGES INTO A SINGLE TRANSMISSION

CROSS REFERENCE TO RELATED APPLICATION

This is a continuation of U.S. application Ser. No. 16/677,813, filed Nov. 8, 2019, U.S. Pat. No. 11,202,273, the content of which is hereby incorporated by reference.

BACKGROUND

Electronic devices can communicate over wired or wireless networks. Wireless networks can include a wireless local area network (WLAN), which includes wireless access points (APs) to which devices are able to wirelessly connect. Other types of wireless networks include cellular networks that include wireless access network nodes to which devices are able to wirelessly connect.

An electronic device can transmit data from multiple sources, whether internal and/or external of the electronic device.

BRIEF DESCRIPTION OF THE DRAWINGS

Some implementations of the present disclosure are described with respect to the following figures.

Figure 1A:
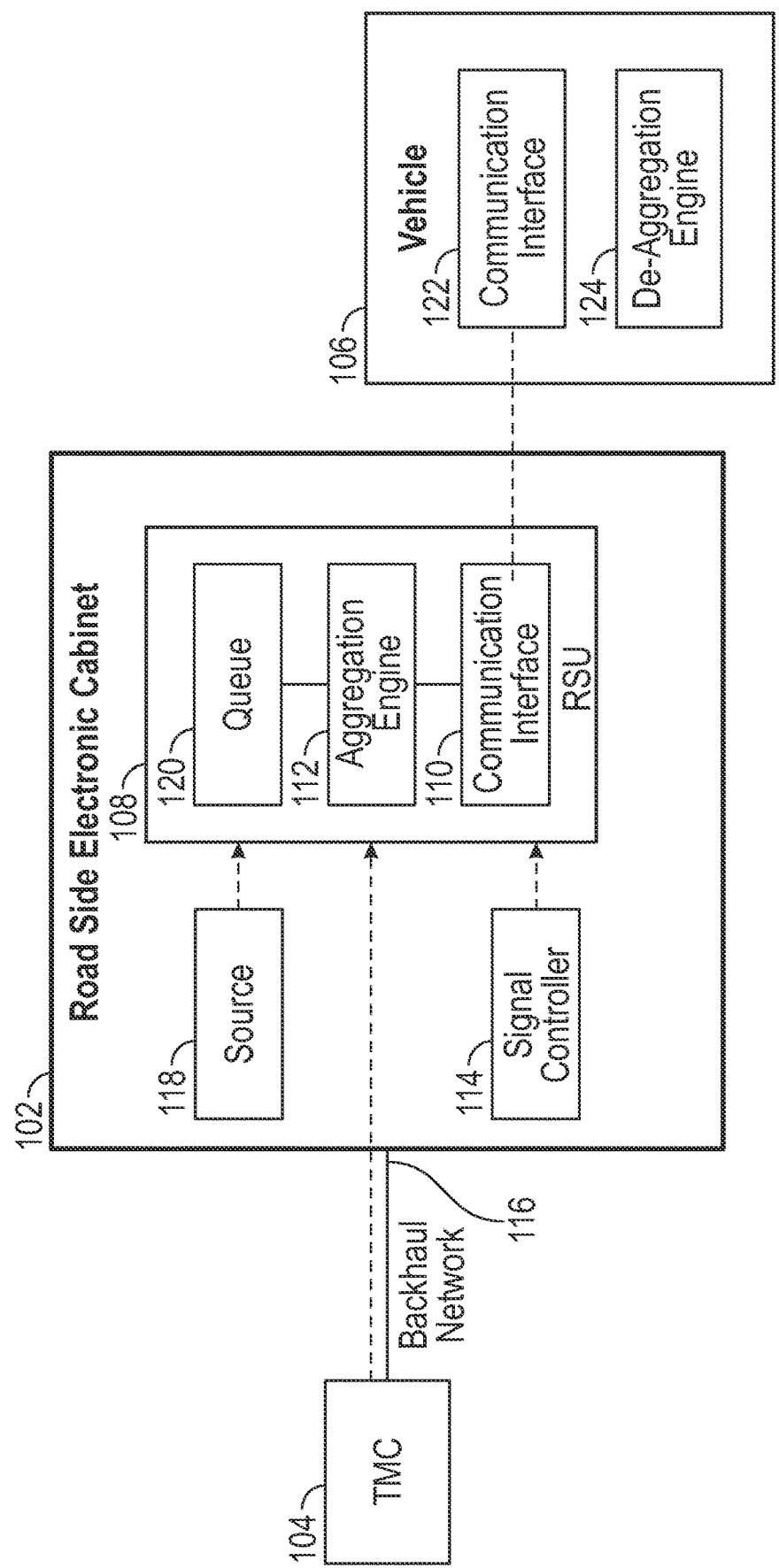
FIG. 1A is a block diagram of an example communication arrangement, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Table 1 below sets forth descriptions of acronyms or abbreviations used in the present description.

TABLE 1

| Acronym/Abbreviation | Full text | Brief Description |
|---|---|---|
| 5G | Fifth Generation Cellular | |
| A-MPDU | Aggregated MAC protocol data unit | An IEEE 802.11 framing technology |
| A-MSDU | Aggregated MAC service data unit | An IEEE 802.11 framing technology |
| CCH | Control Channel | Defined in 1609.4 multichannel operation |
| CSMA | Channel Sense Multiple Access | Distributed/decentralized channel access mechanism used in IEEE 802.11 |
| C-V2X | Cellular V2X | V2X using cellular technologies including LTE and 5G-NR |
| DSRC | Dedicated Short Range Communication | In this document describes the North American standard for V2X communication based on IEEE 802.11p in the 5.9 GHz band. |
| ECU | Electronic Control Unit | |
| IEEE | Institute of Electrical and Electronics Engineers | |
| ITS-G5 | Intelligent Transportation Systems in 5 GHz | European (ETSI) ITS standards |
| LTE-V2X | LTE V2X | Cellular V2X based on LTE PC5 from 3GPP release 14 or 15 |
| MIB | Management Information Base | |
| NEMA | National Electrical Manufacturers Association | An SDO |
| NR | New Radio | The radio technology for 5G |
| OBU | On-board Unit | V2X radio unit in a vehicle |
| OTA | Over The Air | |
| PSID | Provider Service Identifier | Identifier in a data packet of the application it is. |
| SSP | Service Specific Permissions | A set of security enablers offering finer grained control than the PSID |

TABLE 1-continued

| Acronym/Abbreviation | Full text | Brief Description |
| --- | --- | --- |
| RSU | Road Side Unit | The infrastructure radio unit that transmits message over wireless to vehicles (and receives messages from vehicles) |
| SAE | Formerly Society of Automotive Engineers. | Now includes Aerospace Engineers, so the organization is officially just "SAE International" |
| SCH | Service Channel | Defined in IEEE 1609.4 multichannel operation |
| SPaT | Signal Phase and Timing | State of traffic signals encoded to be digitally communicated to vehicles or other infrastructure |
| TIM | Traveler Information Message | Large category of messages the infrastructure can transmit to vehicles including weather reports, curve speed warnings, etc. |
| TMC | Traffic Management Center | A back office infrastructure node that sends messages to RSUs for transmission over wireless. |
| V2X | Vehicle "to" Anything | |
| WSMP | WAVE Signaling Message Protocol | |

Vehicles can be provided with communication components to allow the vehicles to communicate with each other, with a network or other service infrastructure, or with another device. Examples of information that can be transmitted or received by vehicles can include data collected by sensors, traffic information, status information, and so forth.

Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., space planes, space shuttles, space capsules, space stations, satellites, etc.), watercraft (e.g., ships, boats, hovercraft, submarines, etc.), railed vehicles (e.g., trains and trams, etc.), pedestrians and bicycles and other types of vehicles including any combinations of any of the foregoing, whether currently existing or after arising.

Vehicle-to-everything (loosely termed "V2X") is a feature that provides for communication of information from a vehicle to other entities (and possibly also/alternatively vice versa) that may affect the vehicle and/or the other entities. V2X includes one or more of a subset of features, including communication of a vehicle to/from any or some combination of the following: other vehicles (vehicle-to-vehicle or V2V communication); an infrastructure, e.g., road side units (RSUs) (vehicle-to-infrastructure or V2I communication); a pedestrian (vehicle-to-pedestrian or V2P communication); a network (vehicle-to-network or V2N communication); a device, e.g., an electronic device within the vehicle (vehicle-to-device or V2D communication), an electricity grid (vehicle-to-grid or V2G communication); and so forth.

V2X communications can also include transmissions from an RSU to other entities, including vehicles or other entities. An RSU can refer to any device that includes a radio (or other wireless interface) placed at a roadside that receives and transmits messages to vehicles. In the United States of America, the specification for RSUs can include the Dedicated Short Range Communication (DSRC) Roadside Unit (RSU) Specifications Document version 4.1 (or another version). In other examples, RSUs can operate according to other standards or using proprietary specifications.

More generally, V2X communications can include any communication of vehicle-related information from a source device to one or more recipient devices. A "vehicle-related information" can refer to information that includes data pertaining to a vehicle or an infrastructure that supports vehicles (e.g., RSUs, traffic lights, traffic signs, etc.); control information that affects operations of a vehicle or an infrastructure that supports vehicles; navigation data; and any other information that is directly or indirectly associated with vehicles.

Networks that support V2X communication can include a cellular network or another type of wireless network. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks.

Other types of wireless networks can include a wireless local area network (WLAN) that operates according to the Institute of Electrical and Electronics Engineers (IEEE) 802.11 standards (e.g. Dedicated Short Range Communication (DSRC)), IEEE 802.11a standards, IEEE 802.11p standards, IEEE 802.11bd standards (e.g. Enhancements for Next Generation V2X), an Integrated Digital Enhanced Network (iDEN), and so forth.

In some examples, an RSU can have two main modes of operation. In a first mode of operation, the RSU can communicate with vehicles over a single-hop networking technology called WAVE Short Message Protocol (WSMP), as defined in the IEEE 1609.3 standard (for example). In a second mode of operation, the RSU can act as a network access node routing packets, such as Internet Protocol (IP) packets (e.g., IPv6 packets), to a backhaul network.

The following discussion refers to some examples involving the first mode of operation of an RSU.

In other examples, techniques or mechanisms according to the present disclosure can be used with RSUs operating in other modes, or with any other type of device that communicates vehicle-related information (such as in V2X communications).

An RSU can receive vehicle-related information from multiple sources for transmission over a network (wireless network or wired network) to one or more vehicles or other recipient devices. The RSU can be part of a larger device, such as a road side electronic cabinet. A source can include an internal source that is within the device containing the RSU (or a source within the RSU). Alternatively, a source can include an external source that is external of the device containing the RSU (or external of the RSU). An internal source can include an application program, a hardware component, and so forth. An external source can include a traffic management center (TMC) which is connected to the RSU over a backhaul network. The TMC can send messages to RSUs for transmission over wireless networks. Other examples of external sources can provide messages to RSUs.

In addition to RSUs, a vehicle can also receive vehicle-related information from multiple sources for transmission to another entity, where the sources can include internal sources (e.g., electronic control units (ECUs), etc.) and/or external sources (e.g., from user devices of passengers and/or drivers of vehicles, etc.).

Generally, a device (such as an RSU, a vehicle, or any other type of device) that can transmit messages from one or more sources (whether internal and/or external of the device) can be referred to as a "source device."

Issues

A source device transmitting messages generated locally or remotely one at a time, as the messages are received in a transmit queue of the source device, can be inefficient. As an example, transmitting multiple messages one at a time may not efficiently utilize communication resources, such as radio resources, or other resources of networks. For example, a message transmitted over a network may not fully occupy a data frame that carries that message, which is wasteful of the communication resource utilized by the data frame. As another example, delay-intolerant messages may be delayed, or delay-tolerant messages may be transmitted ahead of delay-intolerant messages. Moreover, if the source device were to wait for a next message before sending a currently queued message, to aggregate the messages together into a data frame, there may be a time gap between the messages, which can result in an unacceptable delay of the currently queued message to be transmitted.

A source device can enqueue messages from multiple sources to send over a network. The term "enqueue" refers to the act of receiving a message for further transmission. Messages can be enqueued into a single queue or into multiple queues.

The enqueuing of messages may be uncoordinated since the source device may not properly identify types of messages or types of sources that produced the messages. As a result, the transmission of the messages that have been enqueued may not be efficient.

Example Implementations According to Present Disclosure

In accordance with some implementations of the present disclosure, a source device can categorize messages that are to be transmitted, and arrange the categorized messages so that the transmission of the messages utilize communication resources in a more efficient manner. In some examples, messages of mixed categories can be aggregated into a single transmission such that the messages of the mixed categories can be transmitted together. As used here, a "single transmission" can refer to an "aggregated data frame" or a single transmission opportunity (TXOP). An "aggregated data frame" refers to a data frame into which multiple messages are combined, such that the data frame carrying the multiple messages can be transmitted over a network. A "data frame" can refer to any unit of data that can be separately communicated and identified and that can can be carried by communication resource of a network. A TXOP refers to a time interval or any other communication resource that can be allocated to the source device for use in transmitting information; the source device may be unable to transmit information outside of a TXOP.

In some examples according to the present disclosure, a recipient device can receive aggregated messages and unpack (de-aggregate) the aggregated messages into individual messages for forwarding to one or more recipients. A "recipient" can refer to a program, a machine, a user, or any other entity, whether internal or external of the recipient device.

FIG. 1A is a block diagram of a communication arrangement that includes a road side electronic cabinet 102, a TMC 104, and a vehicle 106. It is noted that there may be multiple road side electronic cabinets, and/or multiple vehicles, and/or multiple TMCs in other examples.

The road side electronic cabinet 102 includes an RSU 108 that has a communication interface 110 that allows the RSU 108 to communicate with the vehicle 106 (or multiple vehicles) over a wireless network (also referred to as OTA or over the air) in some examples. The wireless network can include a cellular network, a WLAN, or any other type of wireless network.

A "communication interface" can refer to a collection of components that allows a device to communicate over a network. For example, the communication interface can include a radio transceiver (or other type of wireless transceiver) to transmit and receive signals over the network. In addition, the communication interface can include protocol layers that are part of a protocol stack that allows the device to communicate information over a network according to one or more protocols, such as any of the protocols discussed in the present description.

For example, the communication interface 110 can communicate according to any of the following: DSRC, Intelligent Transportation Systems in 5 GHz (ITS-G5); LTE-V2X via PC5 mode 4; and so forth.

Although just one communication interface 110 is shown as part of the RSU 108 of FIG. 1A, it is noted that the RSU 108 can include multiple external interfaces, including a local interface to a component (e.g., 114) in the road side electronic cabinet 102; a backhaul interface to the TMC 104 (or other device or system); and the communication interface 108.

The RSU 108 includes an aggregation engine 112 for aggregating messages. As used here, a "message" can refer to any unit of data that can be produced by a source.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The RSU 108 can receive messages from various sources. For example, one of the sources is a signal controller 114 that is part of the road side electronic cabinet 102. The signal controller 114 can be used to control a traffic light, such as at an intersection of multiple roads.

Another source that can provide messages to the RSU 108 is the TMC 104, which transmits messages over a backhaul network 116 (e.g., a cellular network, a WLAN, a fiber optic network, etc.) to the road side electronic cabinet 102.

There can be also other sources, represented generically as source 118. For example, another type of source can include a device for producing map data, such as for navigational purposes. Although not shown, there can also be a source within the RSU 108, such as a program executed by the RSU 108.

The RSU 108 includes one or more queues 120 to enqueue messages received from the various sources, including the signal controller 114, the TMC 104, and the source 118, as examples. A "queue" can refer to any storage, which can be implemented using one or more volatile memory devices and/or one or more non-volatile memory devices.

The vehicle 106 includes a communication interface 122 to communicate with the RSU 108 over a network. In addition, the vehicle 106 includes a de-aggregation engine 124 to de-aggregate aggregated messages (sent by the RSU 108) at the vehicle 106 upon receiving the aggregated messages from the RSU 108. "Aggregated messages" can refer to multiple messages aggregated into a single transmission, such as a single aggregated data frame or a single TXOP.

Although not shown in FIG. 1A, the vehicle 106 can also include an aggregation engine similar to the aggregation engine 112, and the RSU 108 can include a de-aggregation engine similar to the de-aggregation engine 124.

Figure 1B:
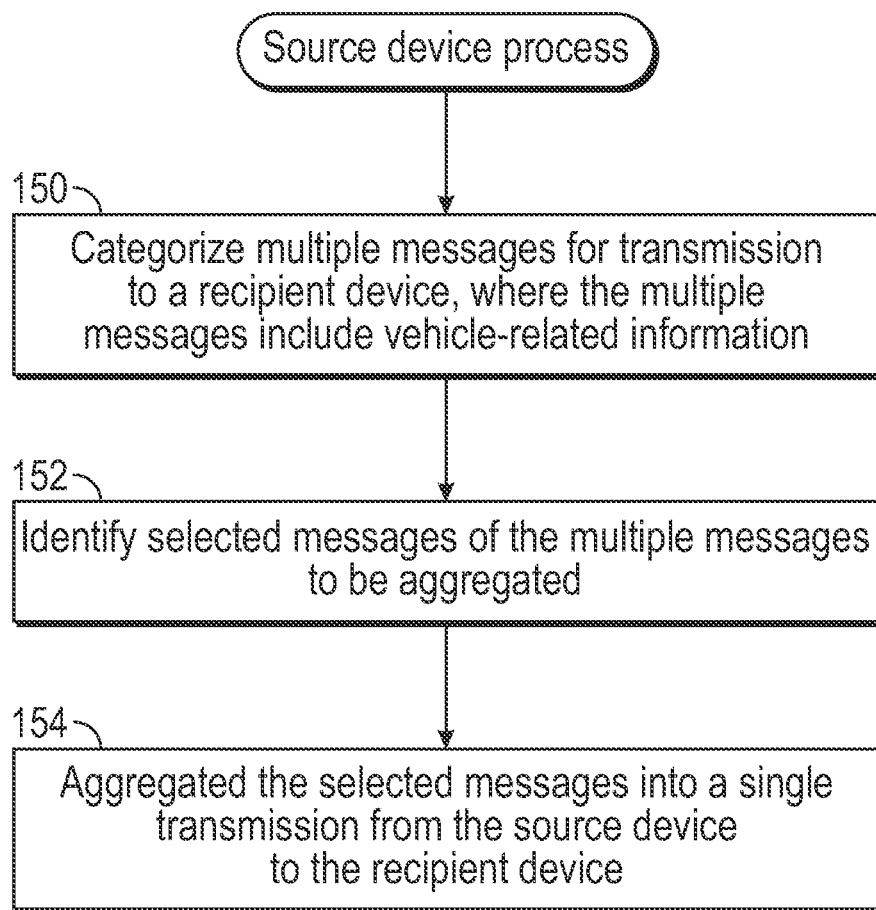
FIG. 1B is a flow diagram of a process performed by a source device, according to some implementations of the present disclosure

FIG. 1B is a flow diagram of a process that can be performed by a source device, such as the RSU 108, the vehicle 106, or any other type of source device.

The source device categorizes (at 150) multiple messages for transmission to a recipient device, where the multiple messages include vehicle-related information.

Based on the categorizing, the source device identifies (at 152) selected messages of the multiple messages to be aggregated.

The source device aggregates (at 154), such as by the aggregation engine 112, the selected messages into a single transmission (e.g., a single aggregated data frame or a single TXOP) from the source device to the recipient device.

In some examples, categorizing of the multiple messages includes identifying delay tolerant messages and delay intolerant messages, and the process can delay transmission of the delay tolerant messages to allow aggregation of the delay tolerant messages with other messages (delay tolerant or delay intolerant messages).

In some examples, categorizing of the multiple messages includes identifying periodic messages and non-periodic messages. The aggregating of the selected messages into the single transmission can include aggregating at least one of the periodic messages with at least one of the non-periodic messages or another periodic message.

In some examples, the process can determine a scheduled time of transmission for a first periodic message, and can use the scheduled time to select the first periodic message for aggregation with another message into the single transmission.

In some examples, aggregating messages into an aggregated data frame can include either of the following types of frame aggregation defined by the IEEE 802.11-2016 standard: Aggregated MAC Service Data Unit (A-MSDU) aggregation, or Aggregated MAC Protocol Data Unit (A-MPDU) aggregation. Both types of the foregoing frame aggregation group several data frames into one larger frame. Because management information is specified only once per frame, the ratio of payload data to the total volume of data is higher, allowing higher communication throughput when frame aggregation is performed.

Packing multiple frames into a single transmission results in a longer transmission (as opposed to a transmission that includes just a single data frame), but reduces inter-frame time gaps and other overheads.

MSDU aggregation collects Ethernet frames to be transmitted to one destination or group-addressed destinations and wraps the Ethernet frames in a single IEEE 802.11 frame. This is efficient because Ethernet headers are much shorter than IEEE 802.11 headers. An A-MSDU contains only MSDUs whose destination address (DA) and sender address (SA) parameter values map to the same receiver address (RA) and transmitter address (TA) values, i.e., all the MSDUs are intended to be received by a single receiver, and all the MSDUs are transmitted by the same transmitter.

Note that it is possible to have different DA and SA parameter values in A-MSDU subframe headers of the same A-MSDU as long as they all map to the same Address 1 and Address 2 parameter values.

MPDU aggregation (A-MPDU) also collects Ethernet frames to be transmitted to a single destination, but each frame still contains its own IEEE 802.11 MAC header within the wrapped-up A-MPDU. Normally this is less efficient than MSDU aggregation, but is actually more efficient in environments with high error rates, because of a mechanism called Selective Block acknowledgement. The Selective Block acknowledgement mechanism allows each of the aggregated data frames to be individually acknowledged or retransmitted if affected by an error.

Categorizing and Aggregating Messages

Messages can be categorized into the following example categories, including categories based on transmission cadence, and categories based on delay tolerance. Although specific categories are mentioned in the described examples, it is noted that other categories for messages can be employed in other examples.

The transmission cadence categories include a periodic category and a random category. Periodic messages (messages according to the periodic category) have a predictable cadence, since the periodic messages are sent periodically or intermittently every specified or scheduled interval.

Examples of messages of the periodic category including the following: "Store and repeat" in the USDOT Specifications for DSRC Roadside Unit; the "SPS flow" in 3GPP TS 36.321, Release 14, where "SPS" stands for "semi-persistent scheduling"; "BSM Part I" in Society of Automotive Engineers (SAE) J2945/1, where "BSM" stands for "Basic Safety Message"; and so forth.

Messages according to the random category include messages generated with unpredictable cadence or one-off messages. Examples of messages according to the random category include "Transmit immediately" in "USDOT Dedicated Short-Range Communications Roadside Unit Specifications"; "One Shot" in 3GPP TS 36.321; and "BSM Part II" in SAE J2945/1.

The delay tolerance categories include a delay intolerant category, and a delay tolerant category. A message according to the delay intolerant category is to be transmitted immediately, or is to be transmitted at a specific time (such as a periodic message).

A delay tolerant message is a message that can be delayed (including a random message or a periodic message), or a message that may be skipped (such as a periodic message).

Figures 2, 3:
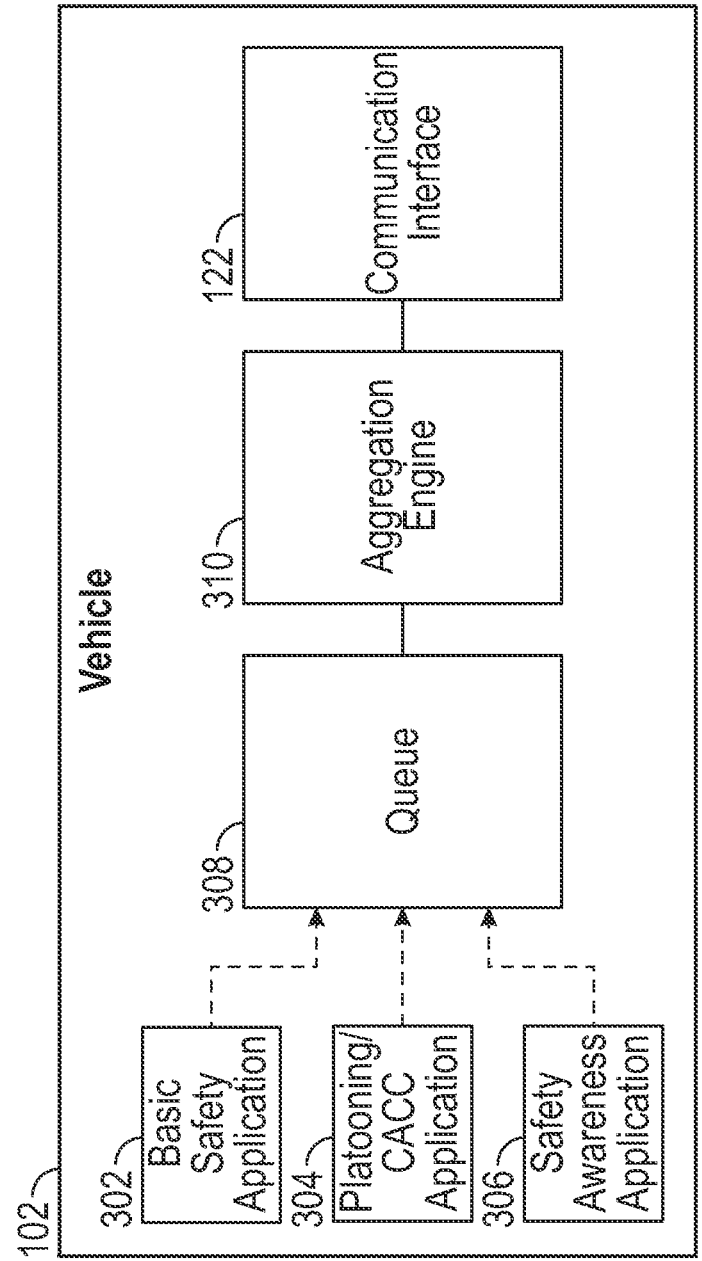
FIG. 2 illustrates various groups of messages containing vehicle-related information, according to some examples.
FIG. 3 is a block diagram of components in a vehicle for performing categorization and aggregation of messages, according to some implementations of the present disclosure.

FIG. 2 shows an example of how a message can be grouped into one of groups A, B, C, and D based on a combination of the transmission cadence categories (periodic category and random category) and the delay tolerance categories (delay tolerant category and delay intolerant category).

A message that is periodic and delay tolerant is part of group A, a message that is delay tolerant and random is part of group B, a message that is periodic and delay intolerant is part of group C, and a message that is random and delay intolerant is part of group D.

In some examples, an aggregation engine (e.g., 112) can identify and bundle (aggregate) periodic messages into aggregated data frames. In other examples, the aggregation engine can also bundle a random message with an enqueued periodic message. In further examples, the aggregation engine can bundle multiple random messages.

In some examples, a source generating a message passes additional information to the RSU 108 about the message the source is asking the RSU 108 to send. The additional information (metadata) can be in the form of an RSU Management Information Base (MIB) extension discussed further below. In other examples, the additional information (metadata) can include a Provider Service Identifier (PSID) (identifier in a message of an application or other source of the message), or a PSID/Service Specific Permissions (SSP) combination of a WSMP packet, or an Intelligent Transportation System Application Identifier (ITS-AID), or an Ethertype, or other information.

The SSP includes a set of security enablers offering finer grained control than the PSID. The PSID or PSID/SSP combination can be used as an indicator of one or both transmission cadence type and delay tolerance category.

An ITS-AID uniquely identifies a service or an application.

An Ethertype is used to indicate which protocol is encapsulated in the payload of a frame.

In some examples, a source device maintains a list of known PSIDs and their associated categorization, including, for example, the above categories. Alternatively, a source device can map a list of PSID/SSP combinations to associated categorizations, or map a list of ITS-AIDs to associated categorizations.

The additional information provided by sources in association with messages can be used by an aggregation engine to determine relative priorities of messages that are to be aggregated. For example, the additional information can include header information from which the priorities can be determined. The header information can be part of a WSMP header or a data frame header.

In some examples, the order in which messages are aggregated into an aggregated data frame can be based on the relative priorities of the messages. For example, a higher priority message (e.g., a delay intolerant message) may be placed ahead of a lower priority message (e.g., a delay tolerant message).

FIG. 3 is a block diagram of components in the vehicle 102 for performing categorization and aggregation of messages according to some implementations of the present disclosure. Generally, FIG. 3 shows an example of an onboard unit (OBU) architecture of a vehicle.

The vehicle 102 includes various sources of messages, including a basic safety application 302 (that implements various safety features of the vehicle 102), a platooning or cooperative adaptive cruise control (CACC) application 304 (for performing cruise control for the vehicle 102), and a safety awareness application 306 (to assist a driver in ensuring safe driving, such as based on detection of vehicles in a blind spot, detection of an object behind or in front of the vehicle, and so forth). Although example sources of messages are shown in FIG. 3, it is noted that the vehicle 102 can include alternative or additional sources of messages.

The sources of messages in the vehicle 102 can be on the same or different central processing unit (CPU) or electronic control unit (ECU), can be in the same or different virtual machines (VMs), or can be different applications.

The messages from the sources 302, 304, and 306 can be enqueued in a queue 308 (or multiple queues).

An aggregation engine 310 categorizes the messages from the sources and aggregates selected messages, based on the categorization, into a single transmission based on the categorizing, in accordance with some implementations of the present disclosure.

In some examples, the queue 308 and aggregation engine 310 are part of a V2X radio stack.

The aggregated messages can then be transmitted to another entity, such as the RSU 108 of FIG. 1A or a different entity, by using the communication interface 122 of the vehicle 102.

Although not shown, the vehicle 102 can also include a de-aggregation engine to unpack (de-aggregate) aggregated messages received in a single transmission (e.g., a single aggregated data frame or a single TXOP).

Frame Aggregation

As noted above, in some examples, frame aggregation can include A-MSDU) aggregation or A-MPDU aggregation. Further details regarding frame aggregation is discussed further in U.S. application Ser. No. 16/676,835, entitled "Aggregation of Data Frames," filed Nov. 7, 2019, which is hereby incorporated by reference.

In some examples, techniques as discussed in U.S. application Ser. No. 16/676,835 can be applied, and extended to perform aggregation of frames based on application properties (or more generally, properties of sources or categories of messages).

Figure 4:
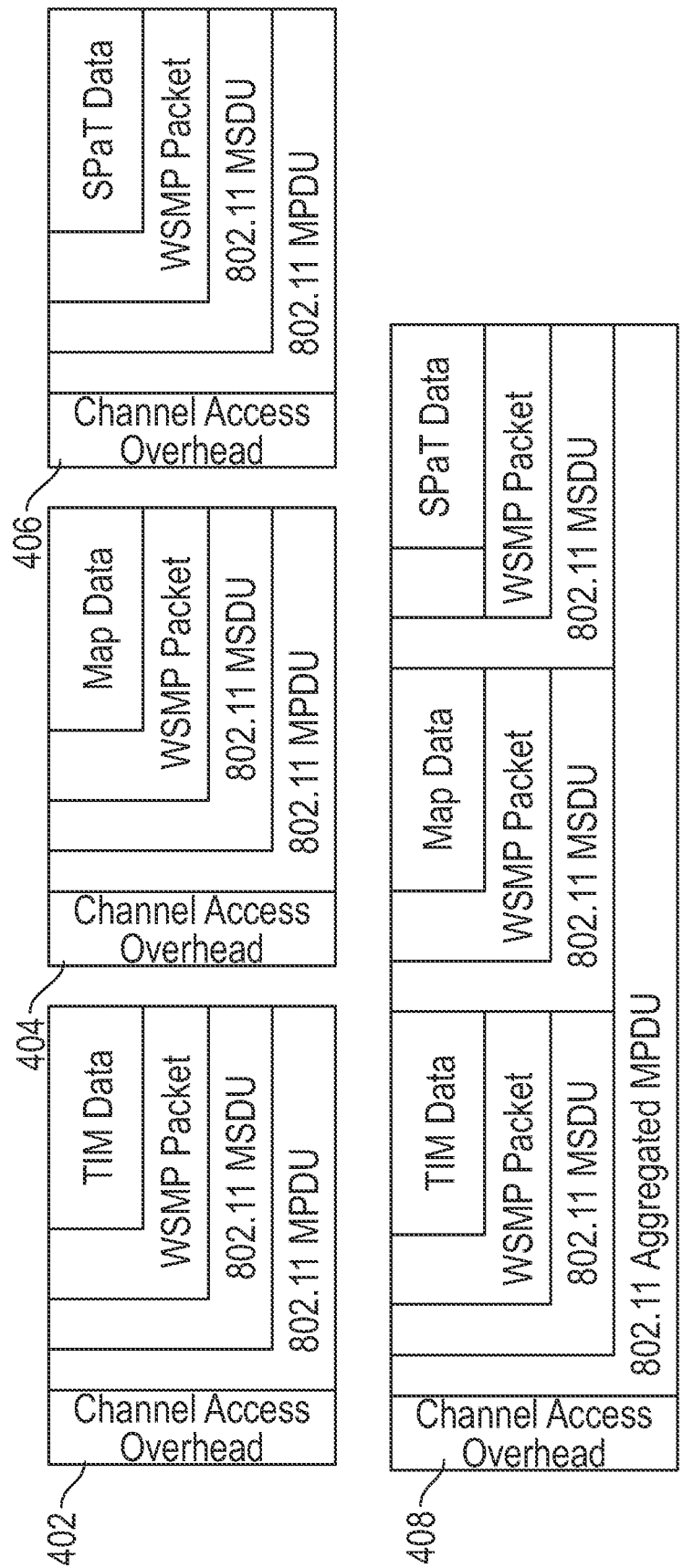
FIG. 4 is a schematic diagram for aggregating Medium Access Control (MAC) protocol data units (MPDUs) into an aggregated MPDU (A-MPDU), according to some examples.

FIG. 4 shows an example of aggregating multiple MPDUs 402, 404 and 406 into an aggregated MPDU 408. The MPDU 402 includes an MSDU, which in turn includes a WSMP packet that contains Traveler Information Message (TIM) data. The MPDU 404 includes an MSDU, which in turn includes a WSMP packet, which contains map data. The MPDU 406 includes an MSDU, which in turn includes a WSMP packet that contains Signal Phase and Timing (SPaT) data. Each MPDU 402, 404, and 406 has a channel address and other overhead information.

Although the MPDUs 402, 404, and 406 are shown as carrying specific types of messages, it is noted that in other examples, an MPDU can carry another type of message.

Once the MPDUs 402, 404, and 406 are aggregated into the aggregated MPDU (A-MPDU) 408, just one channel access delay and other overhead information is included in the aggregated MPDU, rather than the multiple channel access delays and overhead information of the MPDUs 402, 404, and 406. This can result in a reduced amount of data transmitted over the network (e.g., OTA), which improves efficiency in usage of communication resources.

When to Aggregate Messages

In some examples, messages that are time sensitive or latency sensitive are transmitted immediately (i.e., without adding a specified delay), while allowing messages that are delay tolerant or predictable to be queued and subject to further delay. Delay tolerant messages can be bundled together, or with delay intolerant messages.

A source of a message can inform the RSU 108 about the delay tolerance of the message, using the additional information (metadata) discussed further above. The provision of the additional information (metadata) can be on a per frame basis, or per source basis.

In further examples, the RSU 108 may also fragment a message (e.g., a message that is delay tolerant) to allow more efficient aggregation, such as by packing or stuffing an aggregated data frame to its maximum frame size. Fragmenting a message can refer to dividing the message into multiple message fragments, such that one or more of the message fragments can be aggregated with another message into an aggregated data frame.

Note that WSMP as used currently for J2735 based applications are not fragmentable, but in the future other payloads (e.g., Internet Protocol or IP-based payloads) that are fragmentable can be used.

Figure 5:
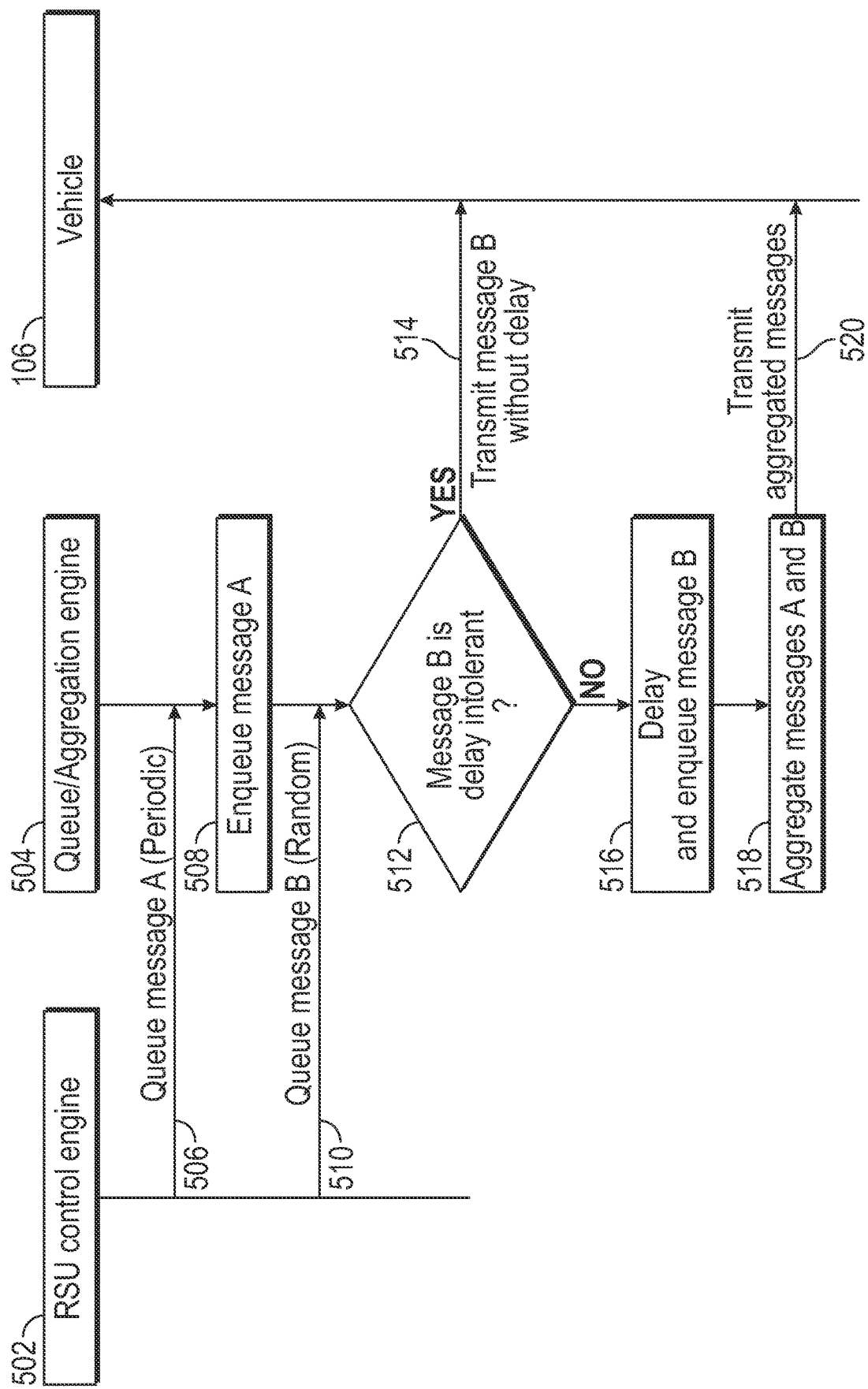
FIGS. 5 and 6 are flow diagrams of example processes for aggregating messages, according to some implementations of the present disclosure.

FIG. 5 shows an example process for aggregating non-periodic messages with periodic messages. In the process of FIG. 5, an RSU control engine 502 (which can be part of the RSU 108) sends (at 506), to the queue/aggregation engine 504, an indication (e.g., a command or other information) to queue message A, which in the example of FIG. 5 is of the periodic category.

The RSU 108 can determine that message A is of the periodic category based on an RSU MIB, a PSID, PSID/SSP combination, and so forth.

The RSU control engine 502 performs control functionality for the RSU 108. The queue/aggregation engine 504 includes a queue and an aggregation engine, such as those shown in FIG. 1A.

Message A is received from a source, such as any of the sources shown in FIG. 1.

The queue/aggregation engine 504 enqueues (at 508) message A, along with information indicating the periodicity of message A. The periodicity of message A can be determined based on reading the RSU MIB, inspecting message body, based on a known fixed period according to a PSID or PSID/SSP, and so forth.

Later, in response to receipt of message B from a source (which can be the same as or different from the source of message A), the RSU control engine 502 sends (at 510), to the queue/aggregation engine 504, an indication to queue message B, which in the example of FIG. 5 is of the random category.

The RSU 108 can determine that message B is of the random category based on an RSU MIB, a PSID, PSID/SSP combination, and so forth.

The queue/aggregation engine 504 determines (at 512) whether message B is delay intolerant, based on similar additional information as listed above.

If message B is delay intolerant, the queue/aggregation engine 504 causes transmission (at 514) of message B without adding a further delay.

If message B is not delay intolerant, the queue/aggregation engine 504 delays and enqueues (at 516) message B.

The queue/aggregation engine 504 aggregates (at 518) message A and message B (which have been enqueued), and transmits (at 520) the aggregated messages in a single transmission at the next scheduled time for message A.

Note that tasks 506 and 508 are performed upon reception of a periodic message to transmit. The repetition of periodic message A can continue indefinitely or for a set amount of time (for example, indicated in the Message Delivery Stop Time field). Tasks 510 to 520 follow the reception of message B during any successive message A transmission period. A delay tolerant message B may be transmitted immediately if there is no successive message A transmission.

In other examples, periodic messages can be aggregated together into a single transmission. The aggregation of periodic messages can consider the periodicity of the messages and the maximum size of a data frame that can fit into a single transmission.

For example, periodic messages of different periodicities can be aggregated together. Moreover, multiple periodic messages (of the same or different periodicities) can also be aggregated with a random message.

Figure 6:
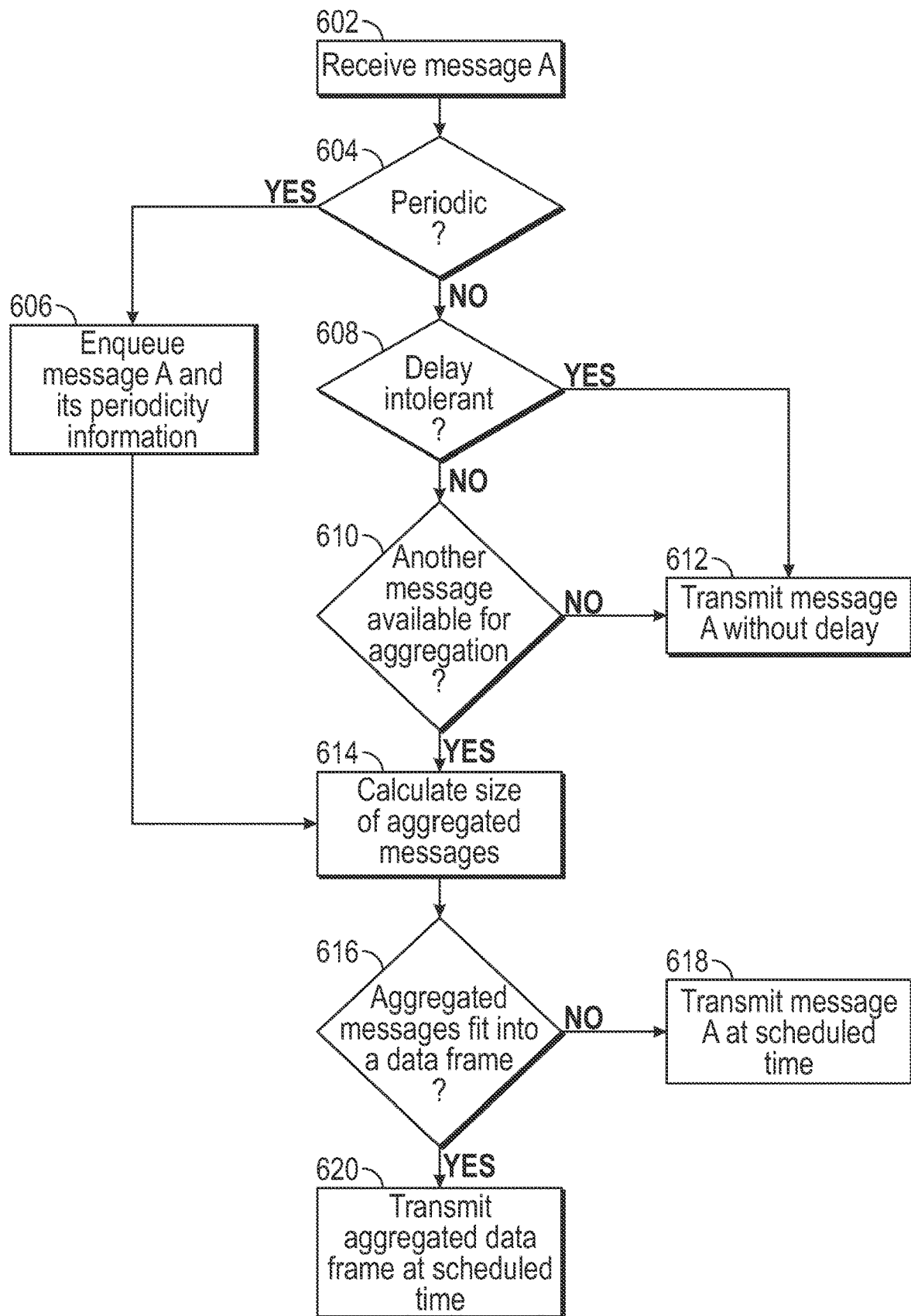

FIG. 6 illustrates another example process for handling aggregation of messages. The process of FIG. 6 can be performed by a source device, for example. The process receives (at 602) message A. The process determines (at 604) whether message A is periodic. If so, the process enqueues (at 606) message A and its periodicity information (i.e., the time at which message A is to be periodically transmitted).

If message A is not periodic, the process determines (at 608) whether message A is delay intolerant. If message A is delay intolerant, the process transmits (at 612) message A without adding further delay. Transmitting a message without adding further delay can refer to transmitting the message immediately or otherwise transmitting the message without adding a specified delay.

If message A is not delay intolerant, as determined at 608, the process determines (at 610) whether there is another message available for aggregation. For example, another message available for aggregation can include an upcoming periodic message that is scheduled for transmission at a future time. As a further example, another message available for aggregation can refer to a random message or another periodic message that has been received while message A has been enqueued.

If another message is not available for aggregation, the process transmits (at 612) message A without adding further delay.

If another message is available for aggregation, the process calculates (at 614) the size of the aggregated messages (i.e., the total size of message A and the other message or other multiple messages that are available for aggregation, less any savings that can be achieved by removing overhead information).

The process determines (at 616) whether the aggregated messages can fit into a data frame, based on the calculated size of the aggregated messages. If not, the process transmits (at 618) message A at the scheduled time. The aggregated messages will not be able to fit into a data frame if the calculated size of the aggregated messages exceeds the maximum size of the data frame, for example.

However, if the aggregated messages can fit into a data frame, the messages are aggregated into an aggregated data frame, and the process transmits (at 620) the aggregated data frame at the scheduled time (e.g., the scheduled time of message A or the scheduled time of another message that is available for aggregation with message A).

Additional Considerations

Aggregation of messages can be employed in the IEEE 1609.4 multichannel operation context. According to IEEE 1609.4, data frames can be transmitted over multiple channels of a wireless network. Messages can be aggregated based on their categorization if the messages are to be transmitted on the same channel.

In some examples, the RSU 108 can use WAVE Service Announcements (WSAs) to organize sources that transmit messages on the same channel, such that messages from such sources that transmit on the same channel can be aggregated using techniques or mechanisms according to some implementations of the present disclosure.

3GPP PC5-based Cellular V2X (C-V2X) has less flexible framing than IEEE 802.11, but also provides opportunity to aggregate multiple upper layer packets into a single lower layer frame. The techniques or mechanisms disused herein may be applied to C-V2X communications while additionally taking into account future semi-persistent scheduled (SPS) transmissions. The fixed Resource Block size of LTE or NR can be used as the basis for packing various messages efficiently into radio transmitted frames.

The categorization and aggregation techniques and mechanisms described for RSUs can also apply to vehicle OBUs transmitting multiple messages from multiple sources. Inter-process protocols and transmit application programming interfaces (APIs) can be used for sources to indicate to a lower layer the delay tolerance or intolerance or the periodicity of a frame being transmitted (in addition to the techniques described for RSUs).

Aggregation Based on Explicit Properties of Sources/Messages

As noted above, messages can be aggregated based on properties of sources of the messages. Additional information (metadata) associated with a message can indicate a property of the source of the message or a property of the message.

For example, the additional information (metadata) can include an RSU MIB.

An aggregation engine receives the additional information of the properties alongside the message to send. As the aggregation engine enqueues the message to send, the aggregation engine uses the properties to decide to aggregate or not, including if and when to delay a message that is to be aggregated.

A local source has an opportunity to inform the radio as the data frames are passed from the upper layers to the lower layers. This interface is described further below.

Aggregating Frames Based on Implied Properties of Sources/Messages

In alternative examples, instead of using explicit information to indicate properties of sources or messages, properties of sources or messages can be implicitly indicated using existing information, such as a PSID, an ITS-AID.

For example, an aggregation engine can make a determination to aggregate messages or not, including decisions to delay transmission of a message in order to aggregate multiple messages based on the Ethertype, PSID, ITS-AID, SSP, or other information already encoded in the frame. This involves looking into the message upper layers as Ethertype is in the IEEE 802.11 header, PSID is in the WSMP header, and SSP is in the SAE J2735 payload.

De-Aggregating Frames at a Recipient Device

Once the combined message is received at the vehicle or other recipient device, a de-aggregation process can be performed to extract the original individual messages from the aggregated messages. The recipient device can validate the security and integrity of each individual message. Each of the validated individual messages is then forwarded to a respective recipient associated with the recipient device.

The recipient device can receive an aggregated data frame and process each of the WSMP headers in the aggregated data frame. Note that each individual frame in the aggregated data frame is subjected to independent security processing (that is different from IEEE 802.11 security processing). The de-aggregation engine (e.g., 124 in FIG. 1) in the recipient device that processes the aggregated data frame can choose to pass the individual messages (once extracted) serially to the upper layers, or to external nodes in priority order as opposed to FIFO. This priority order according to which the messages are delivered to one or more recipients by the de-aggregation engine can be based on the same factors the source device used to decide to aggregate frames.

The recipient device may be able to signal the source device (e.g., the RSU) when an aggregated data frame has been dropped, so that the source device can re-send another aggregated data frame. In some cases, the RSU may decide to not re-transmit periodic messages (e.g., a SPaT message) that is part of the dropped aggregated data frame, as the repeated information may be stale. Therefore, the retransmitted aggregated data frame may differ from that of the original (dropped) aggregated data frame.

At the recipient device, a determination that an aggregated data frame has been dropped can be done by monitoring Medium Access Control (MAC) layer sequence numbers or application layer sequence numbers and finding missing numbers (1, 2, 4, for example, in which case 3 is missing).

The source device may respond to the indication that an aggregated data frame has been dropped by just re-transmitting an individual frame that was lost, instead of aggregating multiple future frames for transmission.

RSU MIB Extension

In some examples, additional properties are communicated from a source to an aggregation engine in a source device (e.g., an RSU) by using any one or more of the MIB parameters below. In some cases, the MIB parameters can be used together, but in general the MIB parameters are independent. This extends the RSU MIB described in section B.4 of "USDOT Specifications for DSRC Roadside Unit v4.1 r5."

rsuSRMDelaySensitive (TRUE/FALSE)

The delay sensitive parameter is set to TRUE for messages that cannot be delayed. This delay sensitive parameter can be set to TRUE for an SPaT message where the timing of the message is specific. This delay sensitive parameter can be set to FALSE for messages that have no specific timing requirement such as MAP messages.

rsuSRMTxJitter (integer32 1 . . . 2147483647)

The allowable jitter parameter is the amount the source device can delay the transmission of a message from the periodic TxInterval specified. For example, if the rsuSRMTxInterval is 1000 milliseconds (ms), the message is transmitted once every second. If the rsuSRMTxJitter is set to 200 ms, then the source device may choose an optimal transmission time between 800 and 1200 ms. A rsuSRMTxJitter value of 0 indicates that the message is sensitive to delay and should be transmitted at exactly the TxInterval period pending the usual CSMA rules for transmission rsuSRMTxAllowedMaxDelay (integer32 1 . . . 2147483647)

The allowed maximum delay parameter is the amount the source device can delay the transmission from the TxInterval specified.

rsuSRMAggregationPermitted (TRUE/FALSE/DON'T CARE)

The Aggregation Permitted flag is set to TRUE if the sender of the message allows the source device to aggregate the frame. The Aggregation Permitted flag is set to FALSE if the source device is disallowed to aggregate the frame. The Aggregation Permitted flag can also be set to a DON'T CARE state. This flag can be present in the following entries for example:

RsuSRMStatusEntry
RsuIFMStatusEntry
RsuDsrcForwardEntry
RsuWsaServiceEntry
MLME-X Extension Additional properties can be communicated from the upper layers to the lower layers of the DSRC radio using the MAC Sublayer Management Entity (MLME) with the parameters below. This extends the MLME/MLME-X described in section 7.5 of IEEE 1609.3-2016. The new proposed parameters are shown in underline in Table 2 below. The existing parameters are not underlined in Table 2.

TABLE 2

| Name | Description |
|---|---|
| source_address | As specified in ISO/IEC 8802-2 [IEEE Std 802.2] |
| destination_address | As specified in ISO/IEC 8802-2 [IEEE Std 802.2] |
| data | As specified in ISO/IEC 8802-2 [IEEE Std 802.2] |
| priority | User priority, as specified in ISO/IEC 8802-2 [IEEE Std 802.2] |
| Channel Identifier | As specified in 7.2 and 7.3.2. Used for WSMP traffic. |
| Time Slot | As specified in 7.3.2. Used for WSMP traffic. |
| Data Rate | As specified in 7.3.2. Used for WSMP traffic. |
| TxPwr_Level | As specified in 5.5.2. Used for WSMP traffic. |
| Channel Load | As specified in 7.3.2. Used for WSMP traffic. |
| WsmExpiryTime | As specified in 7.3.2. Optionally used for WSMP traffic, from the WSM-WaveShortMessage.request Expiry Time parameter. |
| MaxDelay | Maximum time in milliseconds the frame can be queued before transmission. |
| AggregationAllowed | The WSMP packet can be aggregated with other packets in an aggregated PDU. |

TABLE 2-continued

| Name | Description |
|---|---|
| DelayTolerant | Indicates whether the packet can tolerate being delayed before transmission or not |
| Periodic | Indicates that the packet is periodic or not. |
| Period | Indicates the period for a periodic packet. |

Determining Allowable Latency

A PSID based table can be stored in a source device (e.g., an RSU, a vehicle, etc.). This PSID based table contains the following properties.

Aggregation allowed (Yes/No);
Delay tolerant (Yes/No);
Periodic (Yes/No);
Period (time in ms).

A non-exhaustive example table is provided below in Table 3:

TABLE 3

| PSID | Friendly name | Delay Tolerant? | Max Delay | Periodic? | Period |
|---|---|---|---|---|---|
| 0x20 | BSM | No | 0 ms | Yes | 100 ms |
| 0x83 | TIM | Yes | 100 ms | No | 0 ms |
| 0x20-40-97 | MAP | Yes | 1000 ms | Yes | 1000 ms |
| 0x82 | SPaT | No | 0 ms | Yes | 100 ms |

Since PSIDs are general and the BSM (0x20) is used for many different messages transmitted by an OBU and the TIM (0x83) is used for many different messages transmitted by an RSU, the combination of PSID and SSP may be used instead of just the PSID.

Device Architecture

Figure 7:
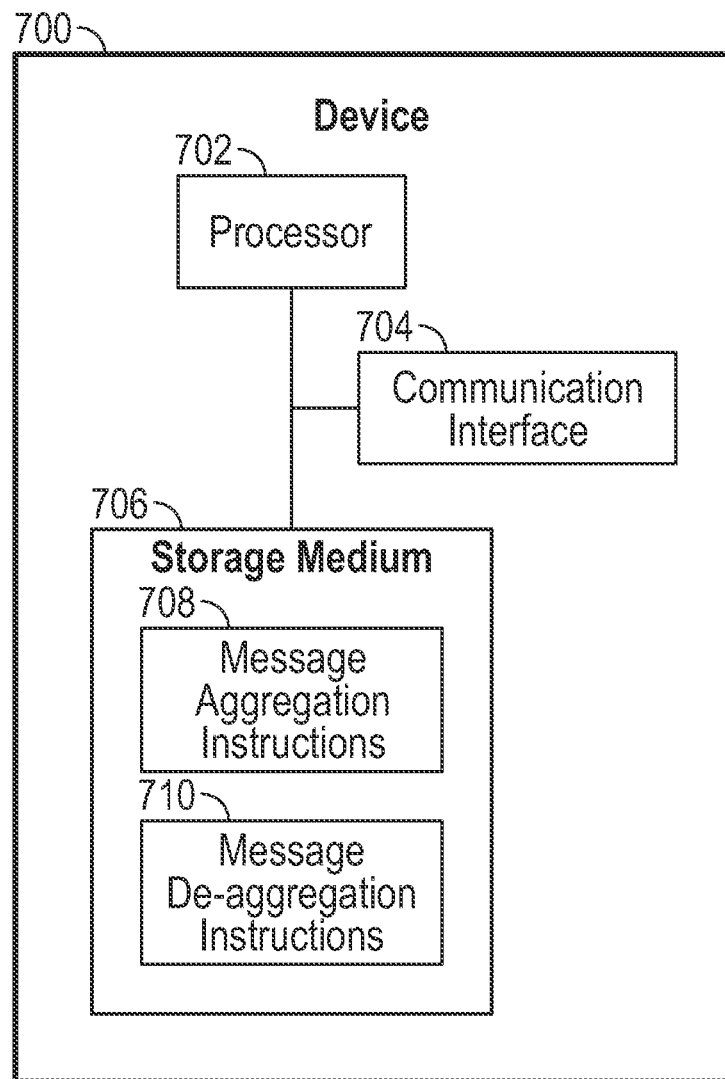
FIG. 7 is a block diagram of a device according to some examples of the present disclosure.

FIG. 7 is a block diagram of a device 700 according to some examples. The device 700 can be an RSU, a vehicle, or any other source device or recipient device.

The device 700 includes one or more hardware processors 702. A hardware processor can include a microprocessor, a core of a multi-core microprocessor, a microcontroller, a programmable integrated circuit, a programmable gate array, a digital signal processor, or another hardware processing circuit.

The device 700 includes a communication interface 704 to communicate over a network.

The device 700 includes a non-transitory machine-readable or computer-readable storage medium 706 that stores machine-readable instructions executable on the one or more hardware processors 702 to perform respective tasks.

The machine-readable instructions include message aggregation instructions 708 to aggregate messages according to some implementations of the present disclosure.

The machine-readable instructions can also include message de-aggregation instructions 710 to de-aggregate aggregated messages into individual messages. The message de-aggregation instructions 710 can receive, from a source device through the communication interface 704, aggregated data that includes a plurality of messages aggregated into a single transmission by the source device, the plurality of messages including vehicle-related information. The message de-aggregation instructions 710 can determine, in header information of the aggregated data, priorities of the plurality of messages. The message de-aggregation instructions 710 can deliver the plurality of messages to one or more recipients according to the determined priorities.

The header information from which the priorities can be determined can be part of a WSMP header or a data frame header.

The storage medium 706 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method performed by a source device, comprising:
    categorizing a plurality of messages for transmission to a recipient device, the plurality of messages comprising vehicle-related information, wherein the categorizing of the plurality of messages comprises identifying delay tolerant messages and delay intolerant messages;
    delaying transmission of the delay tolerant messages to allow aggregation of the delay tolerant messages with other messages;
    based on the categorizing, identifying selected messages of the plurality of messages to be aggregated, wherein the selected messages comprise a first delay tolerant message;
    fragmenting, at the source device, the first delay tolerant message into a plurality of message fragments; and
    aggregating, at the source device, a message fragment of the plurality of message fragments with at least one other message of the selected messages into a single transmission from the source device to the recipient device.

2. The method of claim 1, wherein the single transmission comprises an aggregated data frame comprising an aggregation of the message fragment and the at least one other message.

3. The method of claim 1, wherein the single transmission comprises a single transmission opportunity (TXOP) of the source device.

4. The method of claim 1, wherein the aggregating of the message fragment and the at least one other message into the single transmission comprises aggregating the message fragment with at least one other delay tolerant message.

5. The method of claim 1, wherein the aggregating of the message fragment and the at least one other message into the single transmission comprises aggregating the message fragment with at least one of the delay intolerant messages.

6. The method of claim 1, wherein the categorizing of the plurality of messages comprises identifying periodic messages and non-periodic messages, the method further comprising:
    determining a scheduled time of transmission for a first periodic message of the periodic messages; and
    using the scheduled time to select the first periodic message for aggregation with another message into a single transmission from the source device to the recipient device.

7. The method of claim 1, wherein the source device comprises one of a road side unit, a vehicle, or a traffic management center.

8. The method of claim 1, wherein the categorizing of the plurality of messages is based on message type indication information associated with respective messages of the plurality of messages.

9. The method of claim 8, wherein the message type indication information comprises a Message Information Base (MIB) extension associated with a first message of the plurality of messages.

10. The method of claim 8, wherein the message type indication information comprises a Provider Service Identifier (PSID).

11. The method of claim 8, wherein the message type indication information comprises Service Specific Permissions (SSP) information.

12. The method of claim 8, wherein the message type indication information comprises an Intelligent Transportation System Application Identifier (ITS-AID) or an Ethertype information.

13. The method of claim 1, further comprising:
    receiving a message of the plurality of messages from an internal source inside the source device or from an external source in communication with the source device over a network.

14. The method of claim 1, wherein the message fragment and the at least one other message are aggregated into a single data frame of the single transmission, and wherein a quantity of message fragments of the plurality of message fragments selected to aggregate with the at least one other message into the single data frame packs the single data frame to a maximum frame size of the single data frame.

15. A source device comprising:
    a communication interface to communicate over a network; and
    at least one processor configured to:
        categorize a plurality of messages for transmission to a recipient device through the communication interface, the plurality of messages comprising vehicle-related information, wherein the categorizing of the plurality of messages comprises identifying delay tolerant messages and delay intolerant messages and is based on message type indication information associated with respective messages of the plurality of messages, and wherein the message type indication information comprises a Message Information Base (MIB) extension associated with a first message of the plurality of messages;
        delay transmission of the delay tolerant messages to allow aggregation of the delay tolerant messages with other messages;
        based on the categorizing, identify selected messages of the plurality of messages to be aggregated; and
        aggregate the selected messages into a single transmission from the source device to the recipient device, wherein the aggregating of the selected messages into the single transmission comprises aggregating at least one of the delay tolerant messages with at least one other message.

16. The source device of claim 15, wherein the aggregating of the selected messages into the single transmission comprises aggregating the at least one of the delay tolerant messages with at least one other delay tolerant message.

17. The source device of claim 15, wherein the aggregating of the selected messages into the single transmission comprises aggregating the at least one of the delay tolerant messages with at least one of the delay intolerant messages.

18. The source device of claim 15, wherein the categorizing of the plurality of messages comprises identifying periodic messages and non-periodic messages, and the at least one processor is configured to:
 determine a scheduled time of transmission for a first periodic message of the periodic messages; and
 use the scheduled time to select the first periodic message for aggregation with another message into a single transmission from the source device to the recipient device.

19. The source device of claim 15, wherein the source device comprises one of a road side unit, a vehicle, or a traffic management center.

20. A non-transitory machine-readable storage medium comprising instructions that upon execution cause a source device to:
 categorize a plurality of messages for transmission to a recipient device, the plurality of messages comprising vehicle-related information, wherein the categorizing of the plurality of messages comprises identifying delay tolerant messages delay intolerant messages, periodic messages, and non-periodic messages;
 delay transmission of the delay tolerant messages to allow aggregation of the delay tolerant messages with other messages;
 based on the categorizing, identify selected messages of the plurality of messages to be aggregated;
 aggregate the selected messages into a single transmission from the source device to the recipient device, wherein the aggregating of the selected messages into the single transmission comprises aggregating at least one of the delay tolerant messages with at least one other message;
 determine a scheduled time of transmission for a first periodic message of the periodic messages; and
 use the scheduled time to select the first periodic message for aggregation with another message into a single transmission from the source device to the recipient device.

* * * * *